(12) United States Patent
Panchal et al.

(10) Patent No.: US 11,330,458 B2
(45) Date of Patent: May 10, 2022

(54) SYSTEMS AND METHODS FOR DETECTING AN UNAUTHORIZED AIRBORNE DEVICE

(71) Applicant: Verizon Patent and Licensing Inc., Arlington, VA (US)

(72) Inventors: Jignesh S. Panchal, Hillsborough, NJ (US); Parvez Ahmad, Fremont, CA (US); Michael Kondratiuk, Hillsborough, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 259 days.

(21) Appl. No.: 16/694,768

(22) Filed: Nov. 25, 2019

(65) Prior Publication Data

US 2021/0160721 A1 May 27, 2021

(51) Int. Cl.

| | |
|---|---|
| *H04W 24/10* | (2009.01) |
| *H04L 1/00* | (2006.01) |
| *H04W 36/30* | (2009.01) |
| *G06N 20/00* | (2019.01) |
| *H04W 36/08* | (2009.01) |
| *H04W 36/00* | (2009.01) |

(52) U.S. Cl.
CPC ............ *H04W 24/10* (2013.01); *G06N 20/00* (2019.01); *H04L 1/0026* (2013.01); *H04W 36/0083* (2013.01); *H04W 36/08* (2013.01); *H04W 36/30* (2013.01)

(58) Field of Classification Search
CPC . H04W 24/10; H04W 36/0083; H04W 36/08; H04W 36/30; H04L 1/0026; G06N 20/00
See application file for complete search history.

(56) References Cited

U.S. PATENT DOCUMENTS

2018/0206133 A1\* 7/2018 Venkatraman .......... H04W 4/70
2021/0112515 A1\* 4/2021 Zou ....................... H04W 76/32

FOREIGN PATENT DOCUMENTS

WO WO-2019048127 A1 \* 3/2019 ............ H04W 16/28
WO WO-2019172832 A1 \* 9/2019 ........ H04W 36/0058

\* cited by examiner

*Primary Examiner* — Brian P Cox

(57) ABSTRACT

A device may receive measurement reports for a target device, where the measurement reports include information regarding cells. The device may process the measurement reports and determine whether the target device is airborne. The device may determine, based on determining whether the target device is airborne, whether the target device is authorized to be airborne. The device may determine, based on determining whether the target device is authorized to be airborne, an altitude of the target device to confirm whether the target device is airborne. The device may perform, based on a result of confirming whether the target device is airborne, an action to identify the target device as an unauthorized airborne device and/or manage the target device.

20 Claims, 8 Drawing Sheets

SYSTEMS AND METHODS FOR DETECTING AN UNAUTHORIZED AIRBORNE DEVICE

BACKGROUND

An unmanned aerial vehicle (UAV), commonly known as a drone, is an aircraft without a human pilot on board. A UAV is typically controlled by an onboard computer, a remote control operated by a human, and/or the like.

DETAILED DESCRIPTION OF PREFERRED EMBODIMENTS

Figure 1A:
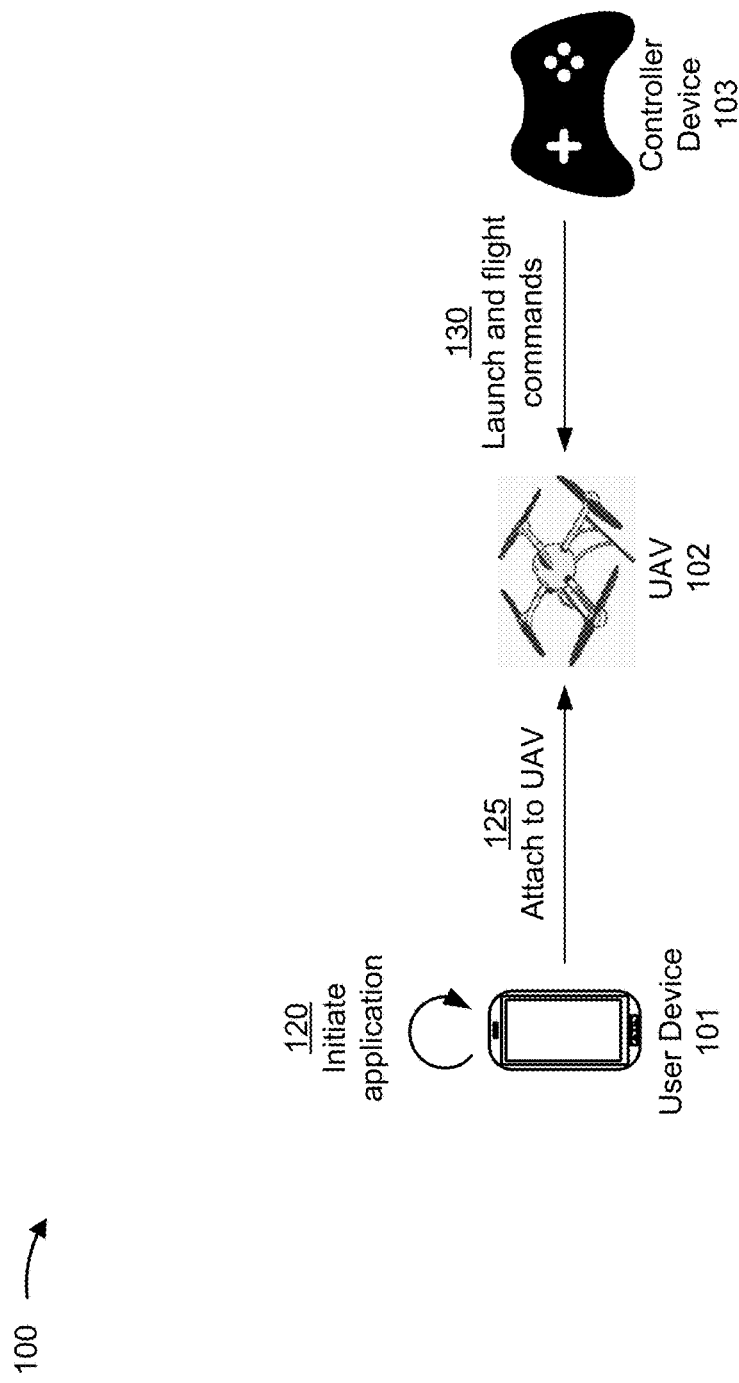
FIGS. 1A-1E are diagrams of one or more example implementations described herein.

The following detailed description of example implementations refers to the accompanying drawings. The same reference numbers in different drawings may identify the same or similar elements.

In some instances, an operator of a UAV may attach a mobile device, such as a smartphone, to the UAV or the UAV may include a camera and hardware to access a cellular network, and the operator may use the mobile device or camera to capture video and/or images while the UAV is in flight and transmit the video and/or images via the cellular network. For example, the operator of the UAV may initiate a video livestream application on the mobile device to transmit, while the UAV is in flight, a live video feed via the cellular network for viewing by others on a website, mobile device application, and/or the like. Using the mobile device in this manner may create problems for the network and may reduce the performance of the cellular network because, for example, the mobile device exchanges signals with a greater number of cell towers due to an increased line of sight while airborne than the mobile device does while on the ground (e.g., less than twenty-five feet above the ground and/or the like). Furthermore, the speed of an airborne mobile device, may force the cellular network to perform more frequent handovers from one cell to another cell than the mobile device does while near the ground.

Additionally, or alternatively, regulatory agencies, such as the Federal Communications Commission (FCC), Federal Aviation Administration (FAA), and/or the like, have regulations requiring network service providers to manage network-connected airborne devices in a different manner than network-connected land-based devices. When a mobile device authorized for ground-based use is attached to a UAV or an unauthorized airborne device with mobile functionality becomes an airborne device, the network service provider may be prevented from managing the mobile device in accordance with relevant regulations.

According to some implementations described herein, a device management platform may detect, classify, and manage airborne devices. In some implementations, the device management platform may receive (e.g., from a serving cell, neighbor cells, and/or the like) measurement reports and/or channel quality indicators for a target device, where the measurement reports include information regarding cells. In some implementations, the device management platform may process the measurement reports using a machine learning model to determine whether the target device is airborne. For example, the machine learning model may determine whether the target device is airborne based on a number of measurement reports received within a time period, a distance between the target device and a cell identified in the measurement reports, a number of cells identified in the measurement reports, a channel quality indicator, an uplink data usage of the target device, a downlink data usage of the target device changes in serving cell reference signal received power (RSRP), changes in serving cell reference signal received quality (RSRQ), a frequency of cell handovers, and/or the like.

In some implementations, the device management platform may determine whether the target device is authorized to be airborne, determine an altitude of the target device to confirm whether the target device is airborne, and perform an action to identify the target device as an unauthorized airborne device, manage the target device, and/or the like. For example, the device management platform may manage the target device by charging an account associated with the target device an airborne access fee, providing, to the target device or another device associated with a user of the target device, a notification that unauthorized airborne use has been detected, enrolling the account associated with the target device in an airborne access service plan, terminating the account associated with the target device, providing, to a law enforcement agency, a notification regarding the unauthorized airborne use of the target device, restricting an uplink data rate for the target device, and/or the like.

In this way, the device management platform may detect airborne devices based on radio-frequency (RF) reporting and data usage, determine whether the airborne devices are authorized to be airborne, and manage the airborne devices to reduce the performance impact of the airborne devices on the cellular network, reduce the frequency of handovers, and/or the like. Additionally, or alternatively, the device management platform permits a network service provider to comply with relevant regulations, take action to discourage unauthorized airborne use of devices, and/or the like.

FIGS. 1A-1E are diagrams of one or more example implementations 100 described herein. For example, as shown in FIGS. 1A-1E, example implementation(s) 100 may include a user device 101, a UAV 102, a controller device 103, a serving cell 104, neighbor cells 105, and a device management platform 106.

As shown in FIG. 1A, and by reference number 120, the user device 101 may initiate an application. In some implementations, the user device 101 may initiate a camera application for capturing images, a video application for capturing video, a social media application for capturing images and/or video, and/or the like. For example, the application may capture images and/or video and transmit the images and/or video via a cellular network for viewing by others on a website, mobile device application, and/or the like. In some implementations, the user device 101 may permit a user to remotely control the application via the controller device 103, another user device, and/or the like.

As shown in FIG. 1A, and by reference number 125, the user device 101 may be attached to the UAV 102. For example, before launching the UAV 102, the user may attach, mount, and/or the like the user device 101 to the UAV 102 such that, when the UAV 102 is in flight, the user device 101 remains attached to the UAV 102. In some implementations, the user device 101 may be attached to the UAV 102 such that a camera of the user device 101 has a particular orientation with respect to the UAV 102 and/or the like. In some implementations, the user device 101 may be attached to the UAV 102 via an adjustable mount on the UAV 102, where the adjustable mount may be controlled by the controller device 103 to change an orientation of the user device 101 with respect to the UAV 102.

As shown in FIG. 1A, and by reference number 130, the controller device 103 may transmit, to the UAV 102, launch and flight commands. For example, the controller device 103 may transmit signals to a flight control system in the UAV 102 instructing the UAV 102 to launch from ground level to become airborne, move in a particular direction (e.g., forward, backward, left, right, and/or the like), increase or decrease elevation, return to ground level and land, and/or the like.

In some implementations, the controller device 103 may provide launch and flight commands using low frequency (e.g., about 900 MHz and/or the like) radio signals, Wi-Fi, and/or the like. For example, the controller device 103 may include a radio transmitter for line-of-sight-based low frequency radio signal control of the UAV 102.

In some implementations, the user device 101 may connect (e.g., via a wired and/or wireless connection) to the UAV 102 such that the controller device 103 may provide signals to the UAV 102, and the UAV 102 may provide the signals to the user device 101. For example, the user device 101 may connect to the UAV 102 via a Bluetooth connection, and the controller device 103 may transmit signals to the UAV 102, which the UAV 102 transmits via the Bluetooth connection to the user device 101. In this way, the controller device 103 may provide instructions to the application on the user device 101.

Additionally, or alternatively, the user device 101 may connect (e.g., via a wired and/or wireless connection) to the UAV 102 such that the controller device 103 may provide signals to the user device 101, and the user device 101 may provide the signals to the UAV 102. For example, the user device 101 may connect to a flight control system of the UAV 102, and the controller device 103 may transmit flight commands to the user device 101 via a cellular network, which the user device 101 transmits to the flight control system of the UAV 102. In this way, the user device 101 may permit the controller device 103 to control the UAV 102 from distances greater than those permitted by line-of-sight-based short-range control signaling.

Figure 1B:
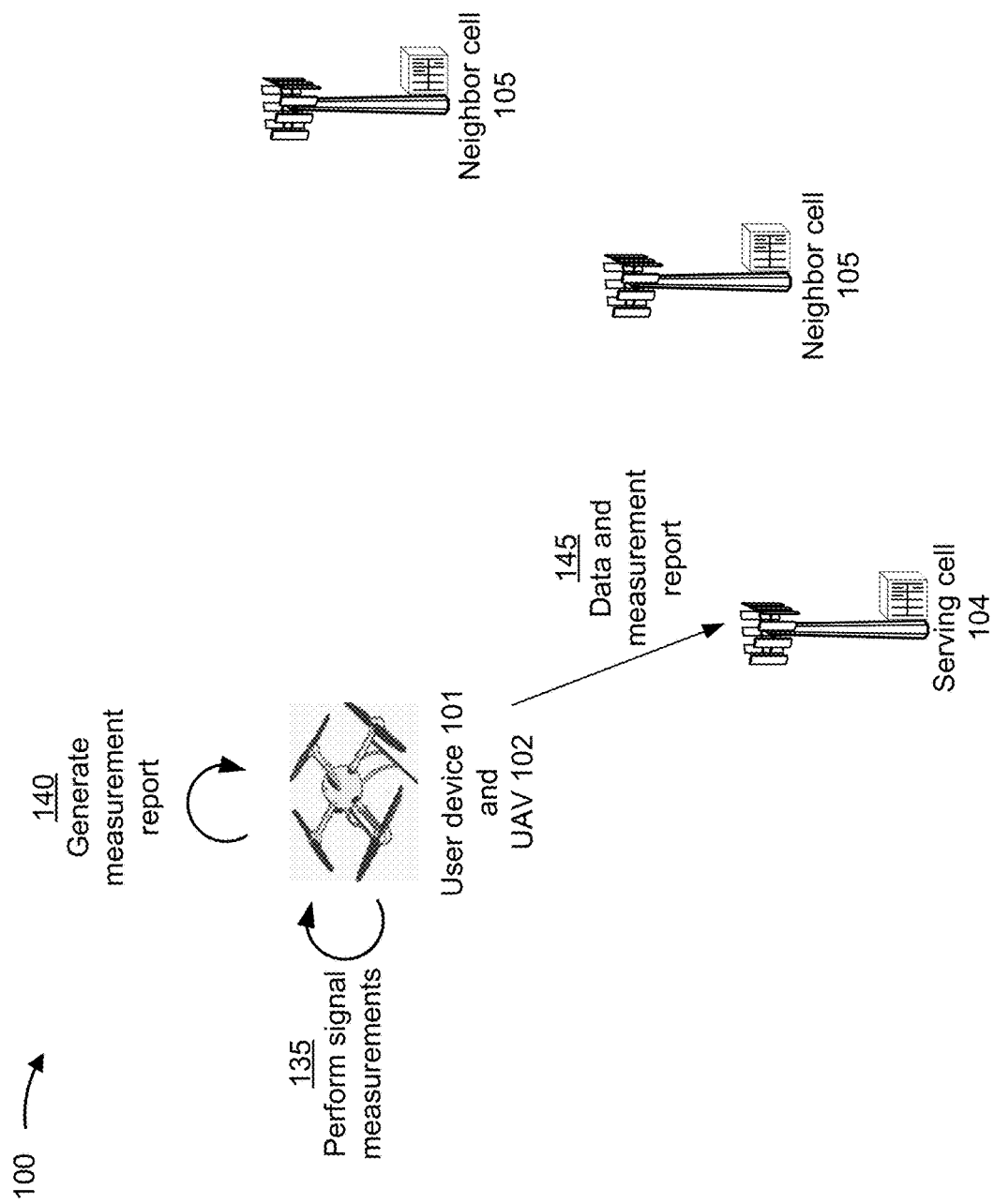

In some implementations, the user device 101, while airborne due to being attached to the UAV 102 in flight, may receive signals from the neighbor cells 105, which are adjacent to the serving cell 104 but not actively serving the user device 101 for purposes of data transmission. For example, and as shown in FIG. 1B, the user device 101 may receive signals from two neighbor cells 105. Although two neighbor cells 105 are shown in FIG. 1B, the user device 101 may receive signals from any number of neighbor cells 105 (e.g., three, four, five, ten, and/or the like). Additionally, or alternatively, the user device 101 may not receive any signals from the neighbor cells 105 (e.g., because the signals are obstructed, the user device 101 is too far away from the neighbor cells 105, and/or the like). In some implementations, the number of neighbor cells 105 from which the user device 101 receives signals may depend on a topology of the cellular network. In some implementations, the user device 101 may receive signals from other cells that are a greater distance from the serving cell 104 than the neighbor cells 105 such that the other cells are not considered to be neighbor cells of the serving cell 104.

As shown in FIG. 1B, and by reference number 135, the user device 101 may perform signal measurements (e.g., signal strength measurements, signal quality measurements, and/or the like) with respect to the serving cell 104 and the neighbor cells 105. For example, the user device 101 may measure reference signal received power (RSRP), reference signal received quality (RSRQ), a channel quality indicator (CQI), and/or the like for signals between the user device 101 and the serving cell 104, and between the user device 101 and each of the neighbor cells 105.

In some implementations, the user device 101 may perform signal measurements continuously, at regular intervals (e.g., one second intervals, five second intervals, thirty second intervals, minute intervals, and/or the like), based on signal strength and/or signal quality with respect to the serving cell 104, based on signal strength and/or signal quality with respect to one or more of the neighbor cells 105, and/or the like. For example, the user device 101, based on changes in RSRP and/or RSRQ with respect to the serving cell 104, may perform the signal measurements with respect to the serving cell 104 and the neighbor cells 105.

As shown in FIG. 1B, and by reference number 140, the user device 101 may generate a measurement report. In some implementations, the user device 101 may generate the measurement report based on the signal measurements. For example, the user device 101 may generate the measurement report based on a trigger event, such as signal strength and/or signal quality for the serving cell 104 satisfying a threshold, signal strength and/or signal quality for one or more of the neighbor cells 105 satisfying a threshold, and/or the like.

In some implementations, the user device 101 may generate the measurement report to include information based on the signal measurements. For example, the user device 101 may generate the measurement report to include information regarding the serving cell 104 and/or the neighbor cells 105, information based on the RSRP, RSRQ, CQI, and/or the like with respect to the serving cell 104 and/or the neighbor cells 105, and/or the like.

As shown in FIG. 1B, and by reference number 145, the user device 101 may provide, to the serving cell 104, data and the measurement report. For example, the user device 101 may provide, to the serving cell 104, data including images and/or video. Additionally, or alternatively, the user device 101 may receive, from the serving cell 104, data from the cellular network. In some implementations, the user device 101 may provide, to the serving cell 104, a CQI.

In some implementations, the user device 101 may provide, to the serving cell 104, the measurement report continuously, at regular intervals (e.g., one second intervals, five second intervals, thirty second intervals, minute intervals, and/or the like), based on generating the measurement report, and/or the like. For example, the user device 101 may provide, to the serving cell 104, the measurement report each time the user device 101 generates the measurement report.

In some implementations, the user device 101 may perform the signal measurements, generate the measurement reports, and provide the measurement reports as part of a cell selection process, cell re-selection process, handover process, and/or the like. For example, the cellular network may use the information in the measurement report to optimize network resource allocation, authorize and/or perform the cell selection process, authorize and/or perform the cell re-selection process, authorize and/or perform the handover process, and/or the like.

In some implementations, the user device 101 may perform the signal measurements, generate the measurement report based on changes in RSRP and/or RSRQ with respect to the serving cell 104, and provide the measurement report to the serving cell 104. In some implementations, as the user device 101 and the UAV 102 ascend and/or descend, changes in elevation may result in greater changes in RSRP and/or RSRQ with respect to the serving cell 104 than changes in RSRP and/or RSRQ when the user device 101 is at ground level (e.g., less than twenty-five feet above the ground and/or the like). Thus, the user device 101, when ascending and/or descending, may generate and provide measurement reports more frequently than when the user device 101 is at ground level.

Figure 1C:
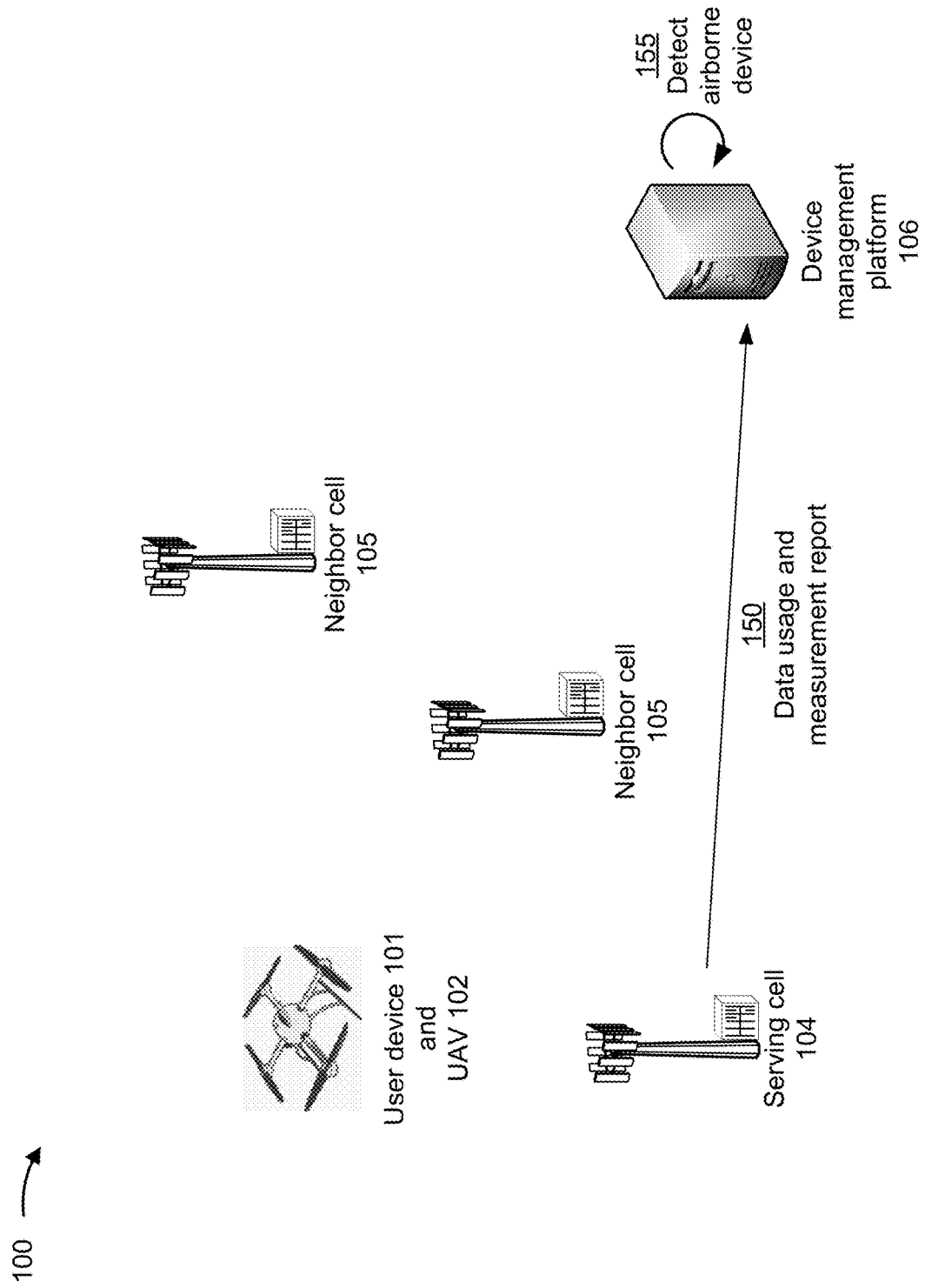

As shown in FIG. 1C, and by reference number 150, the serving cell 104 may provide, to the device management platform 106, data usage and the measurement report. In some implementations, the serving cell 104 may provide, to the device management platform 106, data usage information for the user device 101, where the data usage information includes uplink data usage by the user device 101, downlink data usage by the user device 101, and/or the like. In some implementations, the serving cell 104 may provide, to the device management platform 106, data usage information for the user device 101 continuously, at regular intervals (e.g., five second intervals, ten second intervals, thirty second intervals, minute intervals, and/or the like), based on generating the measurement report, and/or the like.

In some implementations, the serving cell 104 may provide, to the device management platform 106, the measurement report based on receiving the measurement report from the user device 101. For example, the user device 101 may provide the measurement report to the serving cell 104 (as shown by in FIG. 1B and by reference number 145), and the serving cell 104 may receive the measurement report and provide the measurement report to the device management platform 106 based on receiving the measurement report. In this way, the user device 101 and the serving cell 104 may provide usage data and measurement reports to the device management platform 106.

As shown in FIG. 1C, and by reference number 155, the device management platform 106 may detect an airborne device. In some implementations, the device management platform 106 may monitor device behavior as indicated by the usage data and measurement reports for a plurality of devices including the user device 101, and, based on the device behavior, detect whether one or more devices of the plurality of devices is airborne. For example, the device management platform 106 may receive measurement reports for the user device 101 and process the measurement reports for the user device 101 to determine whether the user device 101 is airborne.

In some implementations, the device management platform 106 may monitor device behavior by processing the measurement reports for the user device 101 to determine whether the user device 101 is airborne based on characteristics of device behavior, such as a number of measurement reports received within a time period, a distance between the target device and a cell identified in the measurement reports, a number of cells identified in the measurement reports, a channel quality indicator, an uplink data usage of the user device 101, a downlink data usage of the user device 101, changes in serving cell RSRP, changes in serving cell RSRQ, a frequency of cell handovers, and/or the like. For example, a strong RSRP and a weak RSRQ may indicate that the user device 101 is airborne.

As described herein, the device management platform 106 may use one or more artificial intelligence techniques, such as machine learning, deep learning, and/or the like to detect whether a device, such as the user device 101, is airborne.

In some implementations, the device management platform 106 may parse natural language descriptions of records of device behavior, such as data usage and/or information in measurement reports, for devices at ground level and airborne devices. For example, the device management platform 106 may obtain data identifying, in natural language, a description of device behavior including data usage (e.g., uplink data usage, downlink data usage, and/or the like), information in measurement reports (e.g., RSRP, RSRQ, CQI, cells, cell handovers, distances between devices and cells, and/or the like), and/or the like for a plurality of devices at ground level and a plurality of airborne devices, and may parse the data to identify device behavior associated with devices at ground level, device behavior associated with airborne devices, and/or the like.

In some implementations, the device management platform 106 may determine a characteristic of a device based on natural language processing of the descriptions of data usage and/or information in measurement reports, which may include a description of the device. For example, based on a description of a device being identified as an airborne device, the device management platform 106 may use natural language processing to determine that a characteristic of the device is that the device is associated with being airborne. Similarly, based on a description of a device being identified as being at ground level, the device management platform 106 may use natural language processing to determine that a characteristic of the device is that the device is associated with being at ground level. Additionally, or alternatively, based on a description of a device exhibiting a behavior being identified as behavior of an airborne device, the device management platform 106 may use natural language processing to determine that a characteristic of an airborne device is that the device may exhibit the identified device behavior. In this case, the device management platform 106 may determine that a natural language text corresponds to a characteristic of an airborne device based on data relating to other devices, data identifying characteristics of devices, and/or the like.

In this way, the device management platform 106 may identify characteristics associated with airborne devices, as described herein. Based on applying a rigorous and automated process associated with detecting airborne devices, the device management platform 106 enables recognition and/or identification of thousands or millions of parameters for thousands or millions of devices, thereby increasing an accuracy and consistency of detecting airborne devices relative to requiring computing resources to be allocated for hundreds or thousands of technicians to manually detect airborne devices of the thousands or millions of devices.

In some implementations, the device management platform 106 may determine whether a device is an airborne device, as described herein. For example, using the records of device behavior, the device management platform 106 may determine whether a device is an airborne device. In this case, the device management platform 106 may generate a model for airborne device detection. For example, the device management platform 106 may train a model using information that includes a plurality of records of device behavior for a plurality of devices, a plurality of determinations of whether each of the plurality of devices is airborne, and/or the like, to detect whether a device is an airborne device. As an example, the device management platform 106 may determine that past device behaviors are associated with a threshold probability of being associated with an airborne device. In some implementations, the device management platform 106 may use a scoring system (e.g., with relatively high scores and/or relatively low scores) to identify and/or classify device behaviors as being associated with one another. In this case, the device management platform 106 may determine that a relatively high score (e.g., as being likely to be an airborne device) is to be assigned to characteristics of device behavior that are determined to be the same or similar to characteristics of device behavior previously identified as being associated with an airborne device. In contrast, the device management platform 106 may determine that a relatively low score (e.g., as being unlikely to be an airborne device) is to be assigned to characteristics of device behavior that are determined to be different than characteristics of device behavior previously identified as being associated with an airborne device.

In some implementations, the device management platform 106 may perform a data preprocessing operation when generating the model for airborne device detection. For example, the device management platform 106 may preprocess data (e.g., records of device behavior, such as data usage (e.g., uplink data usage, downlink data usage, and/or the like), measurement reports (e.g., RSRP, RSRQ, CQI, cells, cell handovers, distances between devices and cells, and/or the like), and/or the like) to remove non-ASCII characters, white spaces, confidential data, and/or the like. In this way, the device management platform 106 may organize thousands, millions, or billions of data items for machine learning and model generation.

In some implementations, the device management platform 106 may perform a training operation when generating the model for airborne device detection. For example, the device management platform 106 may portion records of device behavior into a training set (e.g., a set of data to train the model), a validation set (e.g., a set of data used to evaluate a fit of the model and/or to fine tune the model), a test set (e.g., a set of data used to evaluate a final fit of the model), and/or the like. In some implementations, the device management platform 106 may preprocess and/or perform dimensionality reduction to reduce the data of the records of device behavior to a minimum feature set. In some implementations, the device management platform 106 may train the model for airborne device detection on this minimum feature set, thereby reducing processing to train the machine learning model, and may apply a classification technique, to the minimum feature set.

In some implementations, the device management platform 106 may use a classification technique, such as a logistic regression classification technique, a random forest classification technique, a gradient boosting machine learning (GBM) technique, and/or the like, to determine a categorical outcome (e.g., that a device is airborne, that a device is not airborne, and/or the like). Additionally, or alternatively, the device management platform 106 may use a naïve Bayesian classifier technique. In this case, the device management platform 106 may perform binary recursive partitioning to split the data of the minimum feature set into partitions and/or branches and use the partitions and/or branches to perform predictions (e.g., that a device is airborne, that a device is not airborne, and/or the like). Based on using recursive partitioning, the device management platform 106 may reduce utilization of computing resources relative to manual, linear sorting and analysis of data items, thereby enabling use of thousands, millions, or billions of data items to train a model, which may result in a more accurate model than using fewer data items.

Additionally, or alternatively, the device management platform 106 may use a support vector machine (SVM) classifier technique to generate a non-linear boundary between data items in the training set. In this case, the non-linear boundary is used to classify test data (e.g., data relating characteristics of device behavior) into a particular class (e.g., a class indicating that the device is airborne, a class indicating that the device is not airborne, and/or the like).

Additionally, or alternatively, where the test data includes image data, video data, and/or the like, the device management platform 106 may use a computer vision technique, such as a convolutional neural network technique, to assist in classifying test data (e.g., data relating characteristics of device behavior) into a particular class (e.g., a class indicating that the device is airborne, a class indicating that the device is not airborne, and/or the like). In some cases, the computer vision technique may include using an image recognition technique (e.g., an Inception framework, a ResNet framework, a Visual Geometry Group (VGG) framework, and/or the like), an object detection technique (e.g., a Single Shot Detector (SSD) framework, a You Only Look Once (YOLO) framework, and/or the like), an object in motion technique (e.g., an optical flow framework and/or the like), and/or the like.

Additionally, or alternatively, the device management platform 106 may train the model for airborne device detection using a supervised training procedure that includes receiving input to the model from a subject matter expert, which may reduce an amount of time, an amount of processing resources, and/or the like to train the model for airborne device detection relative to an unsupervised training procedure. In some implementations, the device management platform 106 may use one or more other model training techniques, such as a neural network technique, a latent semantic indexing technique, and/or the like. For example, the device management platform 106 may perform an artificial neural network processing technique (e.g., using a two-layer feedforward neural network architecture, a three-layer feedforward neural network architecture, and/or the like) to perform pattern recognition with regard to patterns of whether characteristics of device behavior described using different semantic descriptions can be used to detect whether a device is airborne or not. In this case, using the artificial neural network processing technique may improve an accuracy of a model (e.g., the model for airborne device detection) generated by the device management platform 106 by being more robust to noisy, imprecise, or incomplete data, and by enabling the device management platform 106 to detect patterns and/or trends undetectable to human analysts or systems using less complex techniques.

As an example, the device management platform 106 may use a supervised multilabel classification technique to train the model. For example, as a first step, the device management platform 106 may map characteristics to a device behavior. In this case, the characteristics may be characterized as associated with an airborne device or not associated with an airborne device based on attributes of the characteristics (e.g., whether an attribute of a characteristic is similar or associated with a characteristic of a device behavior) and an analysis of the characteristics (e.g., by a technician, thereby reducing processing relative to the device management platform 106 being required to analyze each activity). As a second step, the device management platform 106 may determine classifier chains, whereby labels of target variables may be correlated (e.g., in this example, labels may be characteristics and correlation may refer to a common attribute of a device behavior). In this case, the device management platform 106 may use an output of a first label as an input for a second label (as well as one or more input features, which may be other data relating to the device behaviors), and may determine a likelihood that a particular characteristic that includes a set of attributes (some of which are associated with a particular device behavior and some of which are not associated with the particular device behavior) is associated with the particular device behavior, based on a similarity to other characteristics that include similar attributes. In this way, the device management platform 106 transforms classification from a multilabel-classification problem to multiple single-classification problems, thereby reducing processing utilization. As a third step, the device management platform 106 may determine a Hamming Loss Metric relating to an accuracy of a label in performing a classification by using the validation set of the data. For example, an accuracy with which a weighting is applied to each characteristic, and whether each characteristic is associated with a device behavior or not, results in a correct prediction of whether a device is airborne or not, thereby accounting for differing amounts to which association of any one characteristic influences whether a device is airborne or not. As a fourth step, the device management platform 106 may finalize the model based on labels that satisfy a threshold accuracy associated with the Hamming Loss Metric, and may use the model for subsequent prediction of whether characteristics of device behavior are to result in the detection of an airborne device.

As another example, the device management platform 106 may determine, using a linear regression technique, that a threshold percentage of characteristics, in a set of characteristics, do not indicate that a device is airborne, and may determine that those characteristics are to receive relatively low association scores. In contrast, the device management platform 106 may determine that another threshold percentage of characteristics do indicate that a device is airborne, and may assign a relatively high association score to those characteristics. Based on the characteristics indicating that a device is airborne or that a device is not airborne, the device management platform 106 may generate the model for airborne device detection and may use the model for airborne device detection for analyzing new characteristics, and/or the like that the device management platform 106 identifies.

In some implementations, a different device, such as a server device, may generate and train the model. The different device may send the model for use by the device management platform 106. The different device may update and send (e.g., on a scheduled basis, on an on-demand basis, on a triggered basis, on a periodic basis, and/or the like) the model to the device management platform 106.

Accordingly, the device management platform 106 may use any number of artificial intelligence techniques, machine learning techniques, deep learning techniques, and/or the like to detect whether a device, such as the user device 101, is airborne.

Additionally, or alternatively, the device management platform 106 may determine whether the user device 101 is airborne based on whether information in the data usage and/or the measurement reports satisfies a threshold quantity of conditions, where the conditions include: a number of measurement reports received within a time period satisfies a first threshold, a distance between the user device 101 and a cell in the measurement reports satisfies a second threshold, a number of cells in the measurement reports satisfies a third threshold, a CQI in the measurement reports satisfies a fourth threshold, a ratio of uplink data usage of the user device 101 to downlink data usage of the user device 101 satisfies a fifth threshold, and/or the like. For example, the device management platform 106 may use initial values for the time period, the first threshold, the second threshold, the third threshold, the fourth threshold, the fifth threshold, and/or the like, and may use an artificial intelligence technique, machine learning technique, deep learning technique, and/or the like to adjust the quantity of conditions that must be met, which conditions are included, the values of the time period, the first threshold, the second threshold, the third threshold, the fourth threshold, the fifth threshold, and/or the like based on results of the device management platform 106 determining whether devices are airborne.

Figure 1D:
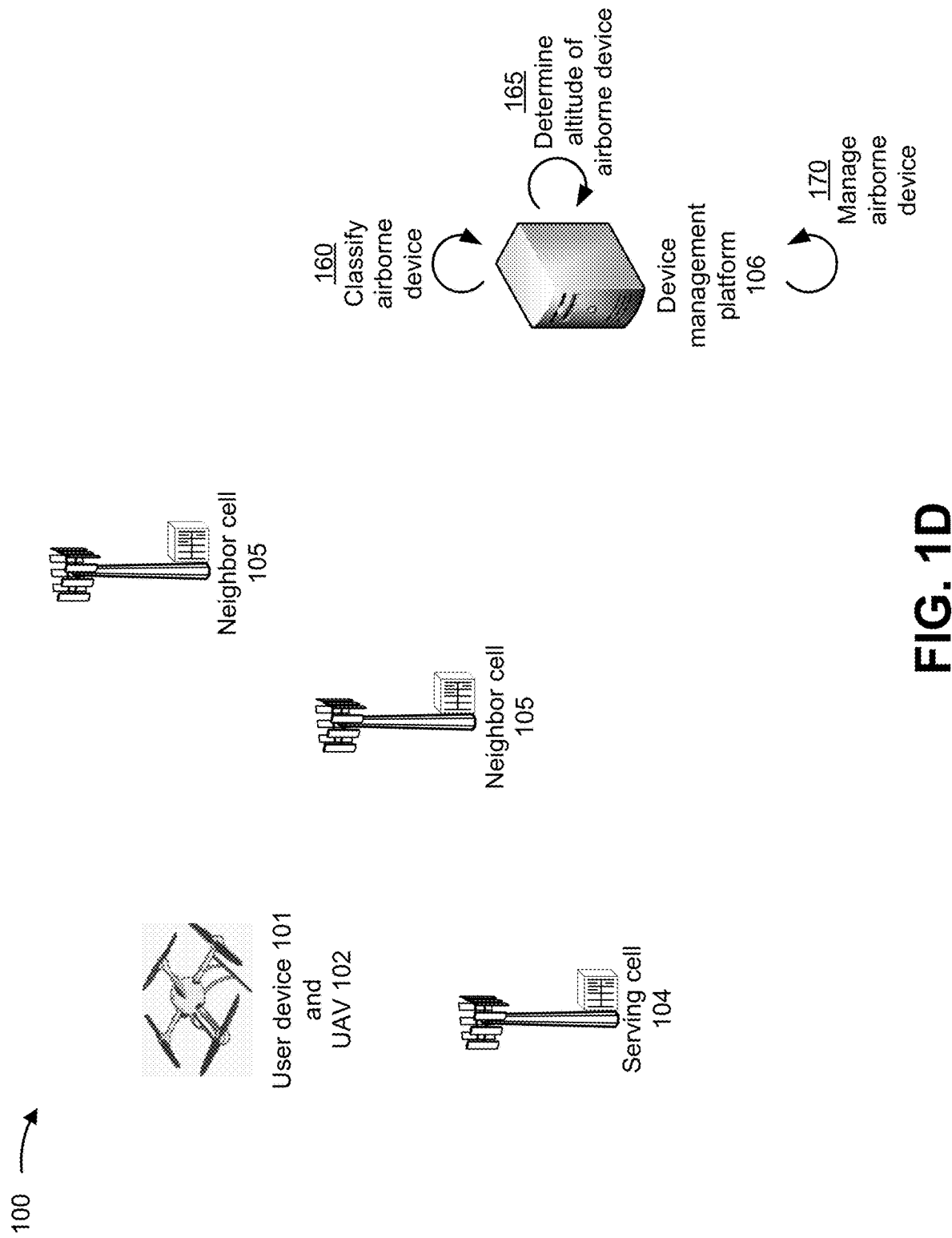

As shown in FIG. 1D, and by reference number 160, the device management platform 106 may classify the airborne device. In some implementations, based on determining that the user device 101 is airborne, the device management platform 106 may classify the user device 101 as authorized to be airborne or unauthorized to be airborne. For example, a network service provider may offer service subscriptions that authorize airborne use of a device and require that the device be configured such that the network service provider may manage the device in accordance with relevant regulations and configured such that the device does not reduce the performance of the cellular network.

In some implementations, the device management platform 106 may determine whether the user device 101 is authorized to be airborne by accessing subscriber information associated with the user device 101 and determining whether the user device 101 is authorized to be airborne based on the subscriber information associated with the user device 101. For example, the device management platform 106 may use a subscriber identity module (SIM), embedded SIM (eSIM), and/or the like for the user device 101 to access the subscriber information associated with the user device 101 (e.g., stored on a home subscriber server and/or the like).

As shown in FIG. 1D, and by reference number 165, the device management platform 106 may determine an altitude of the airborne device. In some implementations, based on determining that the user device 101 is airborne and that the user device 101 is not authorized to be airborne, the device management platform 106 may determine the altitude of the user device 101 to confirm whether the user device 101 is airborne. In some implementations, the device management platform 106 may determine the altitude of the user device 101 using a location-based service, using cell triangulation, by comparing the measurement reports of the user device 101 and other measurement reports received from other devices, and/or the like.

For example, the device management platform 106 may compare the information in the measurement reports of the user device 101 and information in other measurement reports of other devices at a similar location (e.g., based on global positioning system (GPS) coordinates, based on latitude and longitudinal position, and/or the like) to a location of the user device 101. In some implementations, the device management platform 106 may determine, based on the comparison, that the altitude of the user device 101 corresponds to an airborne device and not a device at ground level. For example, if the RSRP and/or RSRQ of the user device 101 are different than the RSRP and/or RSRQ of other devices at ground level at the same or a similar location as the user device 101, the difference between the RSRP and/or RSRQ may indicate that the user device 101 is at a different altitude than the other devices.

In some implementations, the device management platform 106 may not determine the altitude of the user device 101 unless the device management platform 106 determines that the user device 101 is airborne and that the user device 101 is not authorized to be airborne, because the computing and/or network resources used to determine the altitude of the user device 101 may be greater than the computing and/or network resources used to determine that the user device 101 is airborne based on usage data and measurement reports and that the user device 101 is not authorized to be airborne. In this way, the device management platform 106 may conserve computing and/or network resources that would otherwise be consumed by the device management platform 106 determining the altitude of devices, regardless of usage data, measurement reports, and whether the devices are authorized to be airborne.

In some implementations, the device management platform 106, based on a result of confirming whether the user device 101 is airborne, may update the machine learning model used to process the measurement reports to determine whether the user device 101 is airborne. For example, based on a result confirming that the user device 101 is airborne, the device management platform 106 may update the records of device behavior to include the data usage and/or information in measurement reports for the user device 101 as device behavior of an airborne device, and may update, retrain, and/or the like the machine learning model using the updated records of device behavior. Additionally, or alternatively, based on a result confirming that the user device 101 is not airborne, the device management platform 106 may update the records of device behavior to include the data usage and/or information in measurement reports for the user device 101 as device behavior for a device at ground level, and may update, retrain, and/or the like the machine learning model using the updated records of device behavior. In this way, the device management platform 106 may create a feedback loop for both positive and negative reinforcement of the machine learning model, which may improve accuracy of the machine learning model used to determine whether devices are airborne. By improving the accuracy of the machine learning model, the device management platform 106 may conserve computing and/or network resources that would otherwise be consumed if the data from successful detections of airborne devices and false positive detections of airborne devices were not used to update the machine learning model.

As shown in FIG. 1D, and by reference number 170, the device management platform 106 may manage the airborne device. In some implementations, the device management platform 106 may perform, based on a result of confirming that the user device 101 is airborne, an action to manage the user device 101. For example, the device management platform 106 may charge an account associated with the user device 101 an airborne access fee, provide, to the user device 101 or another device associated with a user of the user device 101, a notification (e.g., an email, an automated phone call, a short message service (SMS) message, a multimedia messaging service (MSM) message, a physical letter, and/or the like) that unauthorized airborne use has been detected, enroll the account associated with the user device 101 in an airborne access service plan, terminate the account associated with the user device 101, provide, to a law enforcement agency, a notification regarding the unauthorized airborne use of the user device 101 (e.g., a notification including a location of the user device 101, an altitude of the user device 101, a violation of restricted air space by the user device 101, and/or the like), provide, to a network service provider and/or a carrier, a notification regarding the unauthorized airborne use of the user device 101, and/or the like.

In some implementations, the device management platform 106 may perform an action to manage the user device 101 that avoids increasing a likelihood that the user device 101 is lost and/or damaged, such as maintaining network access for the user device 101 while it is airborne and/or the like. In this way, the device management platform 106 may conserve financial resources that would otherwise be consumed by disabling network access for the user device 101, potentially resulting in loss and/or damage to the user device 101 and/or the UAV 102.

In some implementations, the device management platform 106 may perform an action to manage the user device 101 to preserve the performance of the cellular network, such as restricting an uplink data rate for the user device 101, disabling the ability of the user device 101 to perform a handover process, and/or the like. In this way, the device management platform 106 may conserve computing resources and/or network resources that would otherwise be consumed by permitting the user device 101 to continue to upload data over the network at unrestricted rates and perform frequent handovers.

In some implementations, the device management platform 106 may perform an action to manage the user device 101 based on a number of times the user device 101 has been confirmed to be airborne. For example, the device management platform 106 may update a data structure each time the user device 101 has been confirmed to be airborne, and, based on confirming that the user device 101 is airborne, the device management platform 106 may access the data structure to determine the number of times the user device 101 has been confirmed to be airborne. In some implementations, the device management platform 106 may select, based on the number of times the user device 101 has been confirmed to be airborne, the action to manage the user device 101. For example, the device management platform 106 may select to charge the account associated with the user device 101 an airborne access fee for a first offense, select to charge the account associated with the user device 101 an increasing fee for each subsequent offense, select to enroll the account associated with the user device 101 in an airborne access service plan for multiple offenses (e.g., two, three, five, ten, and/or the like), select to terminate the account associated with the user device 101 for multiple offenses (e.g., two, three, five, ten, and/or the like), and/or the like.

Figure 1E:
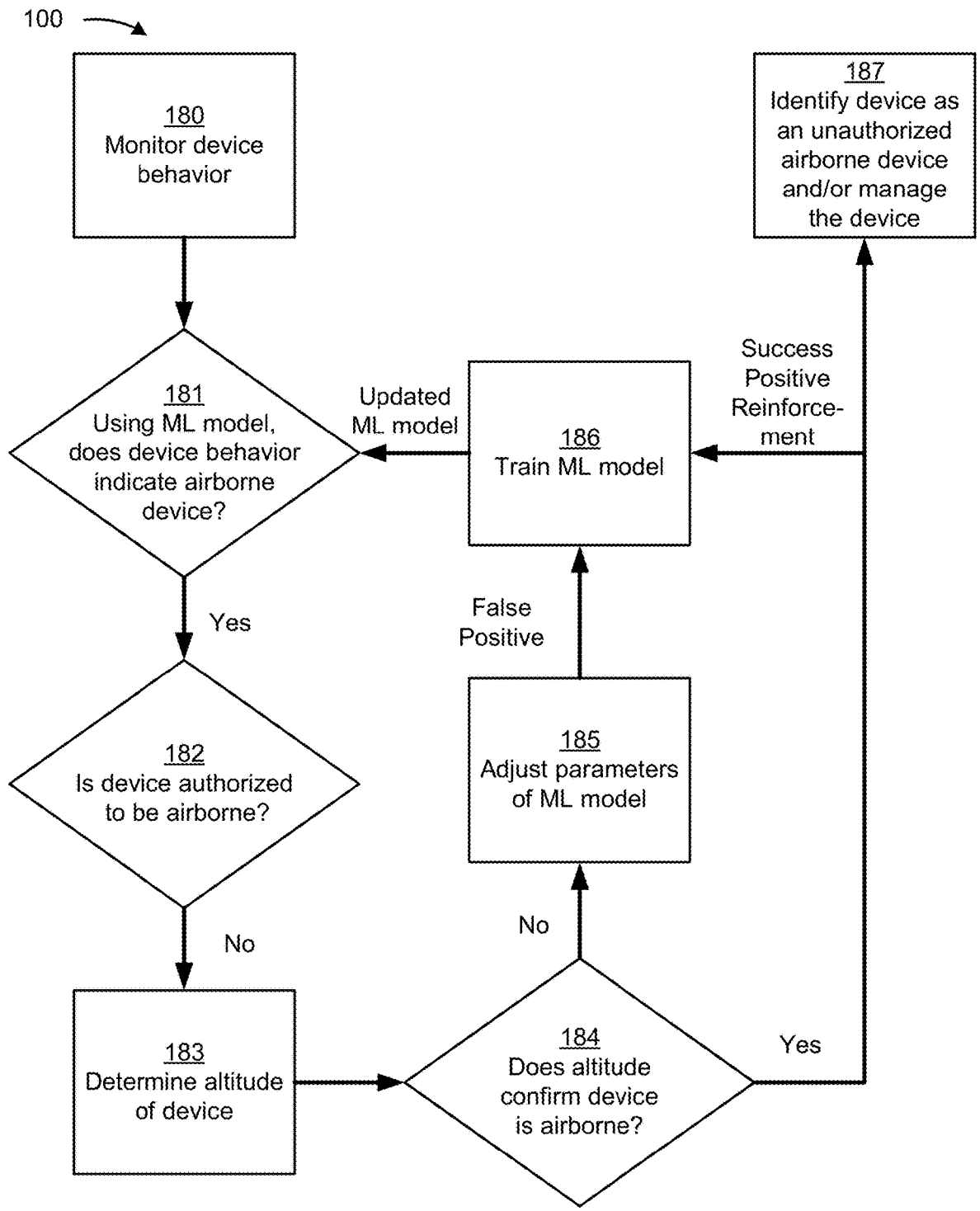

In some implementations, the device management platform 106 may perform one or more of the steps shown in the flow chart of FIG. 1E. For example, the device management platform 106 may monitor device behavior (block 180) by receiving the usage data and/or the measurement reports for the user device 101. In some implementations, the device management platform 106 may determine, using a machine learning model (e.g., the model for airborne device detection and/or the like), whether the device behavior indicates that the user device 101 is airborne (block 181). In some implementations, if the device behavior does not indicate that the user device 101 is airborne, the device management platform 106 may continue monitoring the device behavior of user device 101.

In some implementations, and as shown in FIG. 1E, if the device behavior indicates that the user device 101 is airborne, the device management platform 106 may determine whether the user device 101 is authorized to be airborne (block 182). For example, the device management platform 106 may determine whether the user device 101 is authorized to be airborne by accessing subscriber information associated with the user device 101 and determining whether the user device 101 is authorized to be airborne based on the subscriber information associated with the user device 101. In some implementations, if the user device 101 is authorized to be airborne, the device management platform 106 may stop monitoring the behavior of the user device 101.

In some implementations, and as shown in FIG. 1E, if the user device 101 is not authorized to be airborne, the device management platform 106 may determine an altitude of the user device 101 (block 183). For example, the device management platform 106 may determine the altitude of the user device 101 using a location-based service, using cell triangulation, by comparing the measurement reports of the user device 101 and other measurement reports received from other devices, and/or the like.

In some implementations, and as shown in FIG. 1E, the device management platform 106 may determine whether the altitude of the user device 101 confirms that the user device 101 is airborne (block 184). For example, the device management platform 106 may determine whether the altitude of the user device 101 satisfies an altitude threshold indicating that the user device 101 is airborne. In some implementations, the altitude threshold may depend on a location of the user device 101 to account for buildings, tall structures, and/or the like. Thus, the altitude threshold in one location may be different from the altitude threshold in another location.

In some implementations, and as shown in FIG. 1E, if the altitude of the user device 101 does not confirm that the user device 101 is airborne, the device management platform 106 may adjust parameters of the machine learning model (e.g., the model for airborne device detection and/or the like) used to determine whether the device behavior indicates that the user device 101 is airborne (block 185). As further shown in FIG. 1E, the device management platform 106, having identified a false positive result for detecting an airborne device, may train the machine learning model using the false positive result to generate an updated machine learning model (block 186), and may use the updated machine learning model to determine whether device behavior indicates that a device is airborne.

In some implementations, and as shown in FIG. 1E, if the altitude of the user device 101 confirms that the user device 101 is airborne, the device management platform 106 may identify the user device 101 as an unauthorized airborne device and/or manage the user device 101 (block 187). For example, the device management platform 106 may identify the user device 101 as an unauthorized airborne device by reporting the user device 101 to a law enforcement agency, a regulatory agency, and/or the like. In some implementations, the device management platform 106 may manage the user device 101 by charging an account associated with the user device 101 an airborne access fee, providing, to the user device 101 or another device associated with a user of the user device 101, a notification that unauthorized airborne use has been detected, enrolling the account associated with the user device 101 in an airborne access service plan, terminating the account associated with the user device 101, providing, to a law enforcement agency, a notification regarding the unauthorized airborne use of the user device 101, restricting an uplink data rate for the user device 101, disabling the ability of the user device 101 to perform a handover process, and/or the like.

In this way, the device management platform 106 may detect airborne devices based on radio-frequency (RF) reporting in measurement reports and data usage, determine whether the airborne devices are authorized to be airborne, and manage the airborne devices to reduce the performance impact of the airborne devices on the cellular network, reduce the frequency of handovers, and/or the like. Additionally, or alternatively, the device management platform permits a network service provider to comply with relevant regulations, take action to discourage unauthorized airborne use of devices, and/or the like.

As indicated above, FIGS. 1A-1E are provided as examples. Other examples can differ from what is described with regard to FIGS. 1A-1E. The number and arrangement of devices shown in FIGS. 1A-1E are provided as one or more examples. In practice, there may be additional devices and/or networks, fewer devices and/or networks, different devices and/or networks, or differently arranged devices and/or networks than those shown in FIGS. 1A-1E.

Figure 2:
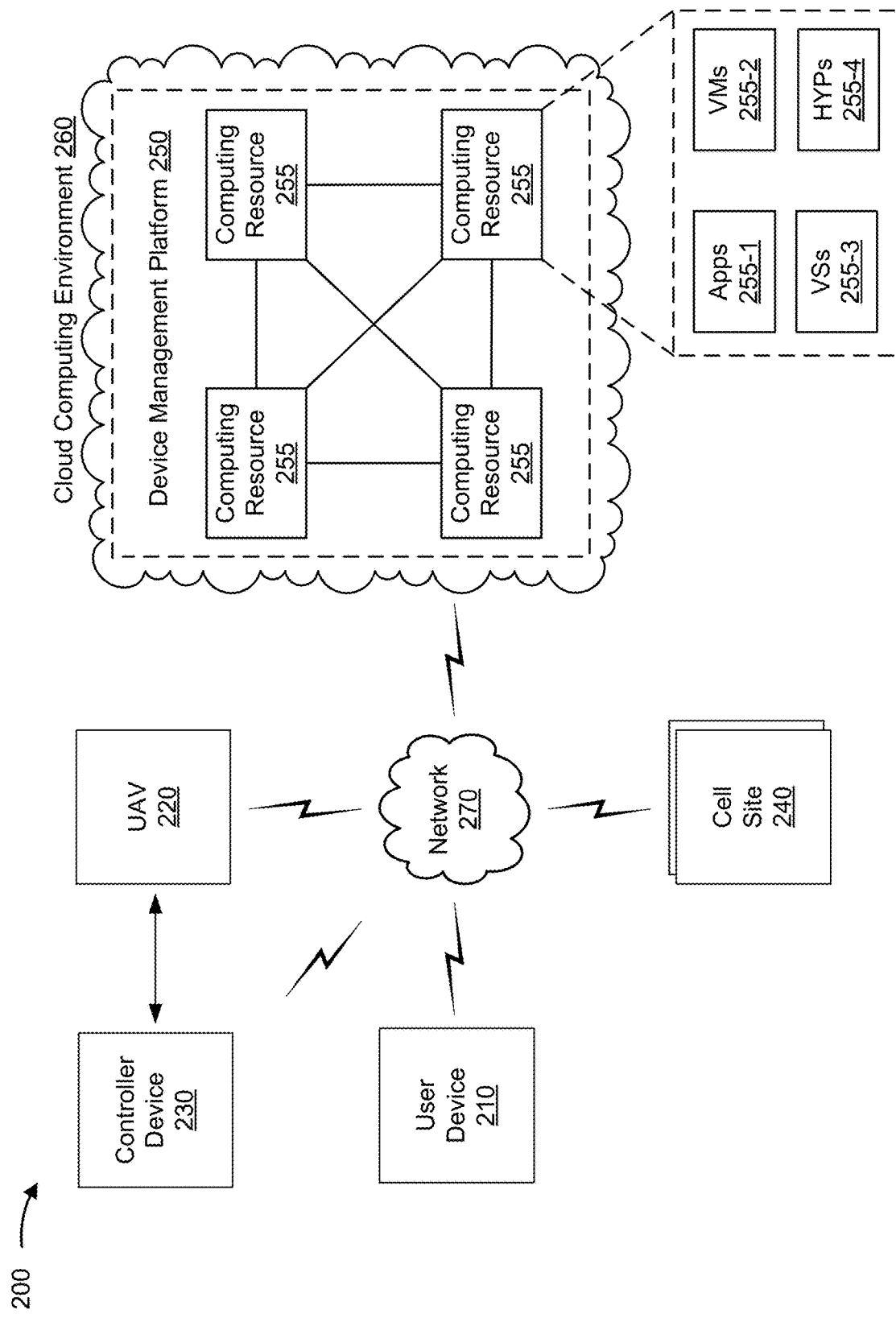
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 210, a UAV 220, a controller device 230, one or more cell sites 240, a device management platform 250, a cloud computing environment 260, and a network 270. In some implementations, the user device 101 of FIGS. 1A-1E may include the user device 210. In some implementations, the UAV 102 of FIGS. 1A-1E may include the UAV 220. In some implementations, the controller device 103 of FIGS. 1A-1E may include the controller device 230. In some implementations, the serving cell 104 and/or the neighbor cells 105 of FIGS. 1A-1E may include the one or more cell sites 240. In some implementations, the device management platform 106 of FIGS. 1A-1E may include the device management platform 250. Devices of environment 200 may interconnect via wired connections, wireless connections, or a combination of wired and wireless connections.

User device 210 includes one or more devices capable of receiving, generating, storing, processing, and/or providing information associated with images, videos, applications, and/or the like. For example, user device 210 may include a communication and/or computing device, such as a mobile phone (e.g., a smart phone, a radiotelephone, and/or the like), a laptop computer, a tablet computer, a handheld computer, a gaming device, a wearable communication device (e.g., a smart wristwatch, a pair of smart eyeglasses, and/or the like), or a similar type of device.

UAV 220 includes aircraft without a human pilot aboard, and can also be referred to as an unmanned aircraft (UA), drone, remotely piloted vehicle (RPV), remotely piloted aircraft (RPA), or remotely operated aircraft (ROA). UAV 220 can have a variety of shapes, sizes, configurations, characteristics, and/or the like for a variety of purposes and applications. In some implementations, UAV 220 may include one or more components for communicating with user device 210 and/or controller device 230. For example, UAV 220 may transmit information to and/or receive information from user device 210 and/or controller device 230, such as sensor data, flight plan information, and/or the like. Additionally, or alternatively, UAV 220 may include an aircraft without a human aboard that is controlled by artificial intelligence, machine learning, and/or the like.

Controller device 230 includes one or more devices capable of receiving, generating, storing, processing, and/or providing information associated with controlling a UAV, images, videos, and/or the like. For example, controller device 230 may include a UAV remote control device, UAV equipment in communication with a UAV, a user device, and/or the like. In some implementations, the controller device 230 may include one or more components for communicating with UAV 220 and/or user device 210. For example, controller device 230 may transmit information to and/or receive information from UAV 220 and/or user device 210, such as sensor data, flight plan information, and/or the like.

Cell site 240 includes one or more devices capable of communicating with user device 210, UAV 220, controller device 230, and/or device management platform 250 using a cellular radio access technology. For example, cell site 240 may include a base transceiver station, a radio base station, a node B, an evolved node B (eNB), a base station subsystem, a cellular site, a cellular tower (e.g., a cell phone tower, a mobile phone tower, and/or the like), a radio access node, a macrocell base station, a microcell base station, a picocell base station, a femtocell base station, or a similar type of device. Cell site 240 may transfer traffic between user device 210, UAV 220, controller device 230, and/or device management platform 250 and network 270. In some implementations, cell site 240 may communicate with user device 210, UAV 220, controller device 230, and/or device management platform 250 (and/or one or more other devices) using radio waves. For example, cell site 240 may receive measurement reports from user device 210 and provide, to device management platform 250, measurement reports and usage data using radio waves.

Device management platform 250 includes one or more computing resources assigned to receive measurement reports, process the measurement reports to determine whether devices are airborne, determine whether devices are authorized to be airborne, determine altitudes of devices, perform actions to identify and/or manage airborne devices, and/or the like. For example, device management platform 250 may be a platform implemented by cloud computing environment 260 that may receive measurement reports, process the measurement reports to determine whether devices are airborne, determine whether devices are authorized to be airborne, determine altitudes of devices, perform actions to identify and/or manage airborne devices, and/or the like. In some implementations, device management platform 250 is implemented by computing resources 255 of cloud computing environment 260.

Device management platform 250 may include a server device or a group of server devices. In some implementations, device management platform 250 may be hosted in cloud computing environment 260. Notably, while implementations described herein may describe device management platform 250 as being hosted in cloud computing environment 260, in some implementations, device management platform 250 may be non-cloud-based or may be partially cloud-based.

Cloud computing environment 260 includes an environment that delivers computing as a service, whereby shared resources, services, and/or the like may be provided to receive measurement reports, process the measurement reports to determine whether devices are airborne, determine whether devices are authorized to be airborne, determine altitudes of devices, perform actions to identify and/or manage airborne devices, and/or the like. Cloud computing environment 260 may provide computation, software, data access, storage, and/or other services that do not require end-user knowledge of a physical location and configuration of a system and/or a device that delivers the services. As shown, cloud computing environment 260 may include device management platform 250.

Computing resource 255 includes one or more personal computers, workstation computers, server devices, or another type of computation and/or communication device. In some implementations, computing resource 255 may host device management platform 250. The cloud resources may include compute instances executing in computing resources 255, storage devices provided in computing resources 255, data transfer devices provided by computing resources 255, and/or the like. In some implementations, computing resources 255 may communicate with other computing resources 255 via wired connections, wireless connections, or a combination of wired and wireless connections.

As further shown in FIG. 2, computing resources 255 may include a group of cloud resources, such as one or more applications ("APPs") 255-1, one or more virtual machines ("VMs") 255-2, virtualized storage ("VSs") 255-3, one or more hypervisors ("HYPs") 255-4, or the like.

Application 255-1 includes one or more software applications that may be provided to or accessed by user device 210, UAV 220, controller device 230, and/or one or more cell sites 240. Application 255-1 may eliminate a need to install and execute the software applications on user device 210, UAV 220, controller device 230, and/or one or more cell sites 240. For example, application 255-1 may include software associated with device management platform 250 and/or any other software capable of being provided via cloud computing environment 260. In some implementations, one application 255-1 may send/receive information to/from one or more other applications 255-1, via virtual machine 255-2.

Virtual machine 255-2 includes a software implementation of a machine (e.g., a computer) that executes programs like a physical machine. Virtual machine 255-2 may be either a system virtual machine or a process virtual machine, depending upon use and degree of correspondence to any real machine by virtual machine 255-2. A system virtual machine may provide a complete system platform that supports execution of a complete operating system ("OS"). A process virtual machine may execute a single program and may support a single process. In some implementations, virtual machine 255-2 may execute on behalf of a user (e.g., user device 210, UAV 220, controller device 230, and/or one or more cell sites 240), and may manage infrastructure of cloud computing environment 260, such as data management, synchronization, or long-duration data transfers.

Virtualized storage 255-3 includes one or more storage systems and/or one or more devices that use virtualization techniques within the storage systems or devices of computing resources 255. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 255-4 provides hardware virtualization techniques that allow multiple operating systems (e.g., "guest operating systems") to execute concurrently on a host computer, such as computing resources 255. Hypervisor 255-4 may present a virtual operating platform to the guest operating systems and may manage the execution of the guest operating systems. Multiple instances of a variety of operating systems may share virtualized hardware resources.

Network 270 includes one or more wired and/or wireless networks. For example, network 270 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
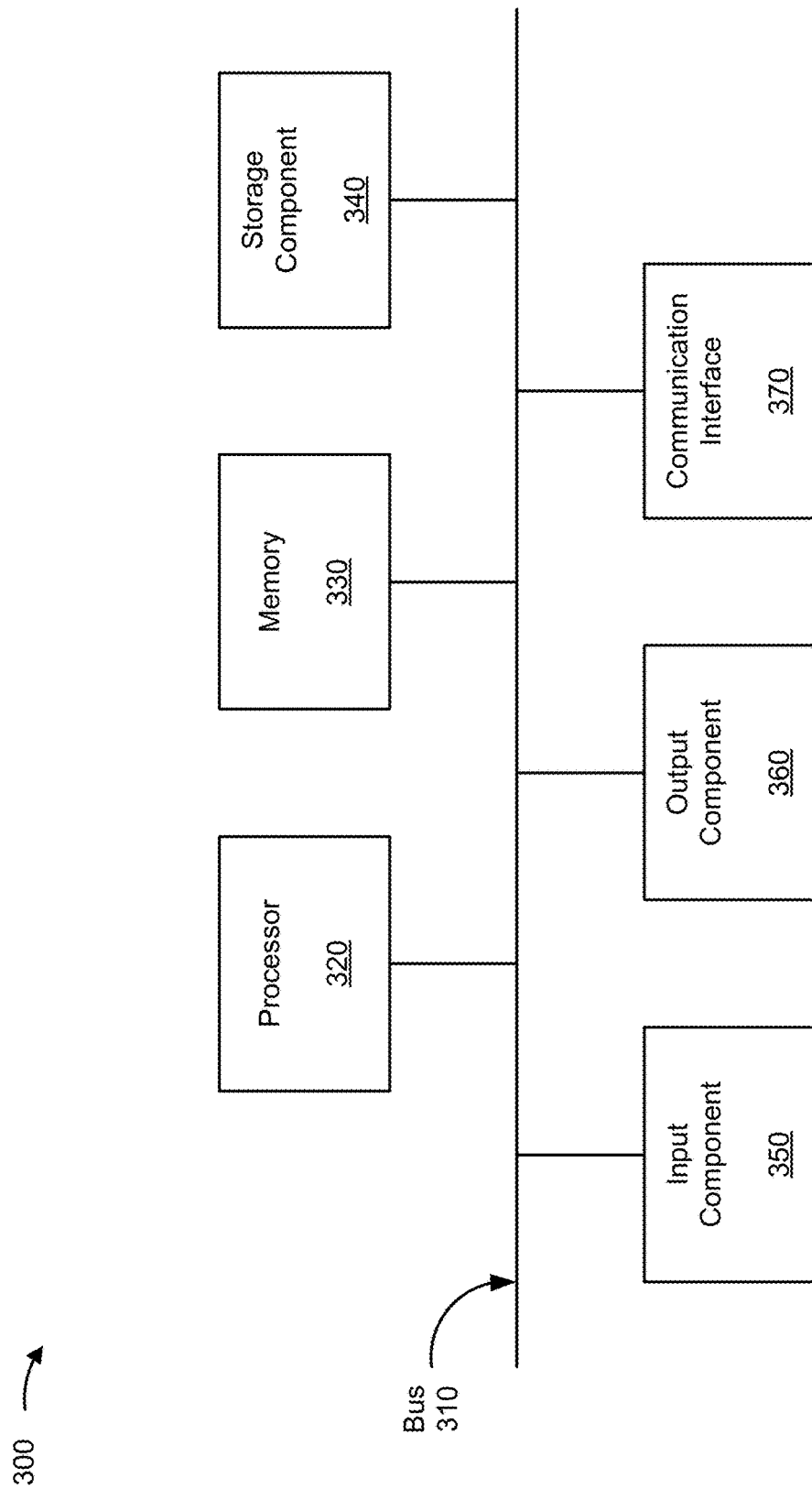
FIG. 3 is a diagram of example components of one or more devices of FIG. 2.

FIG. 3 is a diagram of example components of a device 300. Device 300 may correspond to user device 210, UAV 220, controller device 230, one or more cell sites 240, and/or computing resource 255. In some implementations, user device 210, UAV 220, controller device 230, one or more cell sites 240, and/or computing resource 255 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
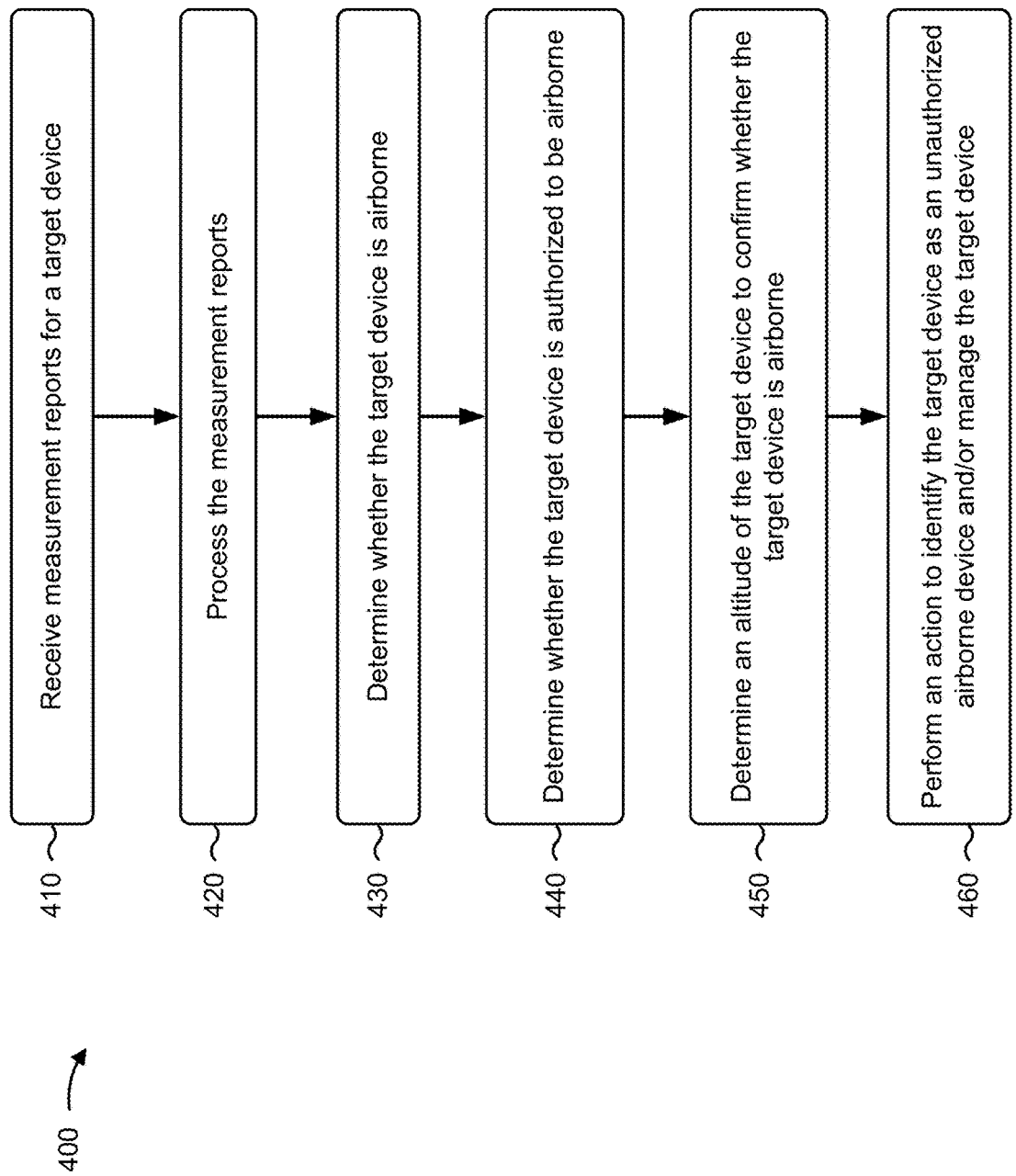
FIG. 4 is a flow chart of an example process for detecting, classifying, and managing an unauthorized airborne device.

FIG. 4 is a flow chart of an example process 400 for detecting, classifying, and managing an unauthorized airborne device. In some implementations, one or more process blocks of FIG. 4 may be performed by a device management platform (e.g., device management platform 250). In some implementations, one or more process blocks of FIG. 4 may be performed by another device or a group of devices separate from or including the device management platform, such as a user device (e.g., user device 210), a UAV (e.g., UAV 220), a controller device (e.g., controller device 230), one or more cell sites (e.g., one or more cell sites 240), a computing resource (e.g., computing resource 255), and/or the like.

As shown in FIG. 4, process 400 may include receiving measurement reports for a target device (block 410). For example, the device management platform (e.g., using processor 320, memory 330, storage component 340, input component 350, output component 360, communication interface 370, and/or the like) may receive measurement reports for a target device, as described above. In some implementations, the measurement reports may include information regarding cells. Additionally, or alternatively, the device management platform may receive the measurement reports for the target device from a serving cell providing network service to the target device and/or from one or more neighbor cells associated with the target device.

As further shown in FIG. 4, process 400 may include processing the measurement reports (block 420). For example, the device management platform (e.g., using processor 320, memory 330, storage component 340, input component 350, output component 360, communication interface 370, and/or the like) may process the measurement reports, as described above.

As further shown in FIG. 4, process 400 may include determining whether the target device is airborne (block 430). For example, the device management platform (e.g., using processor 320, memory 330, storage component 340, input component 350, output component 360, communication interface 370, and/or the like) may determine whether the target device is airborne, as described above. In some implementations, process 400 may include determining, based on the processed measurement reports, whether the target device is airborne based on a number of measurement reports received within a time period, a distance between the target device and a cell identified in the measurement reports, a number of cells identified in the measurement reports, a channel quality indicator, an uplink data usage of the target device, a downlink data usage of the target device, a ratio of uplink data usage of the target device to downlink data usage of the target device, changes in serving cell RSRP, changes in serving cell RSRQ, and/or a frequency of cell handovers.

As further shown in FIG. 4, process 400 may include determining whether the target device is authorized to be airborne (block 440). For example, the device management platform (e.g., using processor 320, memory 330, storage component 340, input component 350, output component 360, communication interface 370, and/or the like) may determine, based on determining whether the target device is airborne, whether the target device is authorized to be airborne, as described above. In some implementations, determining whether the target device is authorized to be airborne may include accessing subscriber information associated with the target device and determining whether the target device is authorized to be airborne based on the subscriber information associated with the target device.

As further shown in FIG. 4, process 400 may include determining an altitude of the target device to confirm whether the target device is airborne (block 450). For example, the device management platform (e.g., using processor 320, memory 330, storage component 340, input component 350, output component 360, communication interface 370, and/or the like) may determine, based on determining whether the target device is authorized to be airborne, an altitude of the target device to confirm whether the target device is airborne, as described above. In some implementations, determining an altitude of the target device may include determining the altitude of the target device using a location-based service, determining the altitude of the target device using cell triangulation, and/or determining the altitude of the target device by comparing the measurement reports and other measurement reports received from other devices.

As further shown in FIG. 4, process 400 may include performing an action to identify the target device as an unauthorized airborne device and/or manage the target device (block 460). For example, the device management platform (e.g., using processor 320, memory 330, storage component 340, input component 350, output component 360, communication interface 370, and/or the like) may perform, based on a result of confirming whether the target device is airborne, an action to identify the target device as an unauthorized airborne device and/or manage the target device, as described above. In some implementations, performing an action to manage the target device may include charging an account associated with the target device an airborne access fee, providing, to the target device or another device associated with a user of the target device, a notification that unauthorized airborne use has been detected, enrolling the account associated with the target device in an airborne access service plan, terminating the account associated with the target device, providing, to a law enforcement agency, a notification regarding the unauthorized airborne use of the target device, and/or restricting an uplink data rate for the target device.

Process 400 may include additional implementations, such as any single implementation or any combination of implementations described below and/or in connection with one or more other processes described elsewhere herein.

In some implementations, process 400 may include processing the measurement reports using a machine learning model to determine whether the target device is airborne. In some implementations, process 400 may include updating and/or retraining the machine learning model based on a result of confirming whether the target device is airborne.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a device, measurement reports for a target device, wherein the measurement reports include information regarding cells;
   processing, by the device, the measurement reports;
   determining, by the device, based on the processed measurement reports, whether the target device is airborne based on a number of measurement reports received within a time period, a distance between the target device and a cell identified in the measurement reports, a number of cells identified in the measurement reports, a channel quality indicator, and/or a ratio of uplink data usage of the target device to downlink data usage of the target device;
   determining, by the device, based on determining that the target device is airborne, whether the target device is authorized to be airborne;
   determining, by the device, based on determining that the target device is not authorized to be airborne, an altitude of the target device to confirm whether the target device is airborne; and
   performing, by the device, based on confirming whether the target device is airborne, an action to identify the target device as an unauthorized airborne device and/or manage the target device,
      wherein performing the action to identify the target device as the unauthorized airborne device and/or manage the target device comprises:
         charging an account associated with the target device an airborne access fee.

2. The method of claim 1, wherein determining whether the target device is authorized to be airborne comprises:
   accessing subscriber information associated with the target device, and
   determining whether the target device is authorized to be airborne based on the subscriber information associated with the target device.

3. The method of claim 1, wherein determining the altitude of the target device comprises:
   determining the altitude of the target device using a location-based service,
   determining the altitude of the target device using cell triangulation, and/or
   determining the altitude of the target device by comparing the measurement reports and other measurement reports received from other devices.

4. The method of claim 1, wherein performing the action to manage the target device comprises at least one of:
   providing, to the target device or another device associated with a user of the target device, a first notification that unauthorized airborne use has been detected,
   enrolling the account associated with the target device in an airborne access service plan,
   terminating the account associated with the target device, or
   providing, to a law enforcement agency, a second notification regarding the unauthorized airborne use of the target device.

5. The method of claim 1, wherein processing the measurement reports and determining whether the target device is airborne comprises processing the measurement reports using a machine learning model to determine whether the target device is airborne.

6. The method of claim 5, further comprising:
   updating the machine learning model based on a result of confirming whether the target device is airborne.

7. The method of claim 1, wherein receiving the measurement reports for the target device comprises receiving the measurement reports for the target device from a serving cell providing network service to the target device and/or from one or more neighbor cells associated with the target device.

8. A device, comprising:
   one or more processors, configured to:
      receive measurement reports for a target device, wherein the measurement reports include information regarding cells;
      process the measurement reports to determine whether the target device is airborne based on a number of measurement reports received within a time period, a distance between the target device and a cell identified in the measurement reports, a number of cells identified in the measurement reports, a channel quality indicator, an uplink data usage of the target device, a downlink data usage of the target device, changes in serving cell Reference Signal Received Power, changes in serving cell Reference Signal Received Quality, and/or a frequency of cell handovers;

determine, based on determining whether the target device is airborne, whether the target device is authorized to be airborne;

determine, based on determining whether the target device is authorized to be airborne, an altitude of the target device to confirm whether the target device is airborne;

provide, based on confirming that the target device is airborne, a notification that unauthorized airborne use has been detected; and charge an account associated with the target device an airborne access fee.

9. The device of claim 8, wherein the one or more processors, to process the measurement reports to determine whether the target device is airborne, are configured to process the measurement reports using a machine learning model to determine whether the target device is airborne.

10. The device of claim 8, wherein the one or more processors, to determine whether the target device is authorized to be airborne, are configured to access subscriber information associated with the target device and determine whether the target device is authorized to be airborne based on the subscriber information.

11. The device of claim 8, wherein the one or more processors are further configured to restrict, based on confirming that the target device is airborne, an uplink data rate for the target device.

12. The device of claim 8, wherein the one or more processors, to determine the altitude of the target device, are configured to:

determine the altitude of the target device using a location-based service, determine the altitude of the target device using cell triangulation, and/or determine the altitude of the target device by comparing the measurement reports from the target device and other measurement reports received from other devices.

13. The device of claim 8, wherein the notification is a first notification, and wherein the one or more processors are further configured to:

enroll the account associated with the target device in an airborne access service plan, terminate the account associated with the target device, and/or provide, to a law enforcement agency, a second notification regarding the unauthorized airborne use of the target device.

14. The device of claim 8, wherein the one or more processors, to receive measurement reports for the target device, are configured to receive measurement reports for the target device from a serving cell providing network service to the target device and/or from one or more neighbor cells of the serving cell.

15. A non-transitory computer-readable medium storing instructions, the instructions comprising:

one or more instructions that, when executed by one or more processors, cause the one or more processors to:

receive measurement reports for a target device, wherein the measurement reports include information regarding cells;

process the measurement reports using a machine learning model to determine whether the target device is airborne based on a number of measurement reports received within a time period, a distance between the target device and a cell identified in one or more of the measurement reports, a number of cells identified in the measurement reports, a channel quality indicator, and/or a ratio of uplink data usage of the target device to downlink data usage of the target device;

determine, based on determining that the target device is airborne, whether the target device is authorized to be airborne;

determine, based on determining that the target device is not authorized to be airborne, an altitude of the target device to confirm that the target device is airborne;

update the machine learning model based on confirming that the target device is airborne; and charge an account associated with the target device an airborne access fee based on confirming that the target device is airborne and based on determining that the target device is not authorized to be airborne.

16. The non-transitory computer-readable medium of claim 15, wherein the one or more instructions, that cause the one or more processors to determine whether the target device is authorized to be airborne, cause the one or more processors to access subscriber information associated with the target device and determine whether the target device is authorized to be airborne based on the subscriber information.

17. The non-transitory computer-readable medium of claim 15, wherein the one or more instructions, that cause the one or more processors to determine the altitude of the target device, cause the one or more processors to:

determine the altitude of the target device using a location-based service, determine the altitude of the target device using cell triangulation, and/or determine the altitude of the target device by comparing the measurement reports and other measurement reports received from other devices.

18. The non-transitory computer-readable medium of claim 15, wherein the one or more instructions, when executed by the one or more processors, further cause the one or more processors to:

provide, to the target device, a first notification that unauthorized airborne use has been detected;

enroll the account associated with the target device in an airborne access service plan;

terminate the account associated with the target device; and/or provide, to a law enforcement agency, a second notification regarding the unauthorized airborne use of the target device.

19. The non-transitory computer-readable medium of claim 15, wherein the one or more instructions, when executed by the one or more processors, further cause the one or more processors to restrict, based on confirming that the target device is airborne, an uplink data rate for the target device.

20. The non-transitory computer-readable medium of claim 15, wherein the one or more instructions, that cause the one or more processors to receive the measurement reports for the target device, cause the one or more processors to receive the measurement reports for the target device from a serving cell providing network service to the target device and/or from one or more neighbor cells associated with the serving cell.

* * * * *